Feb. 13, 1940.     R. E. EVARTS     2,190,419
PIPE JOINT
Filed July 19, 1937
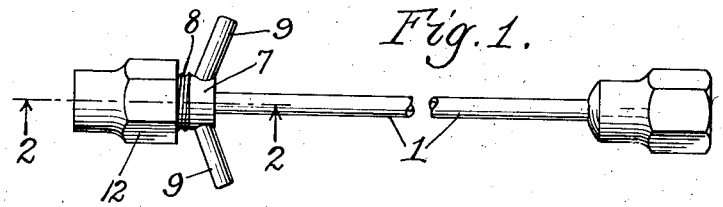
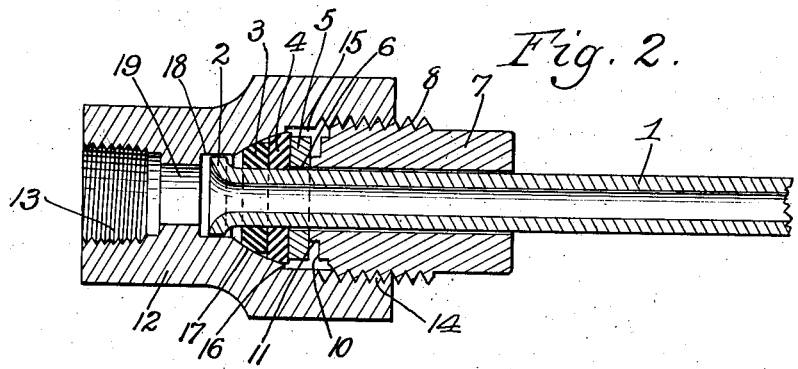
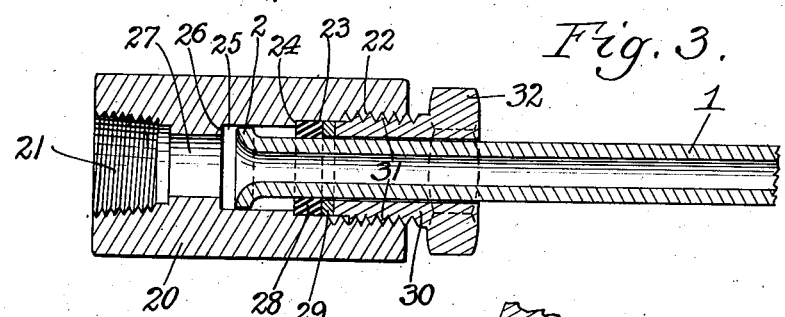
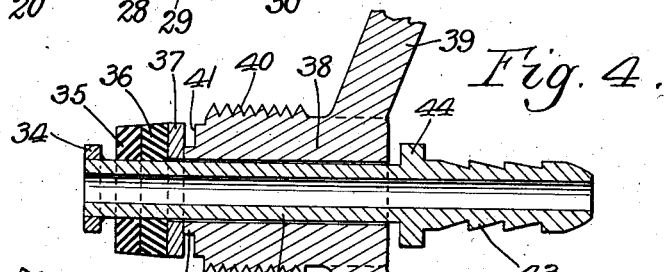
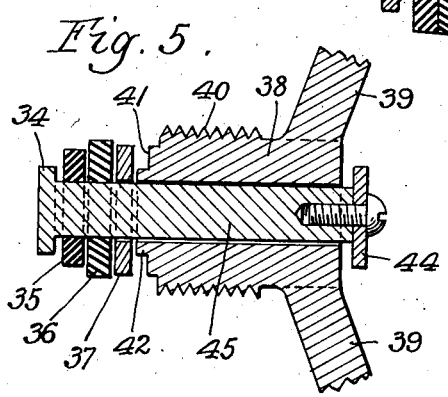
Inventor
Ralph E. Evarts
by Parker + Carter
Attorneys.

Patented Feb. 13, 1940

2,190,419

UNITED STATES PATENT OFFICE 2,190,419

PIPE JOINT

Ralph E. Evarts, Chicago, Ill., assignor to The Bastian-Blessing Co., Chicago, Ill., a corporation of Illinois Application July 19, 1937, Serial No. 154,473

1 Claim. (Cl. 285—166)

This invention relates to a coupling and has for one object to provide a means for coupling a pipe or conduit to a suitably prepared member and to provide a simple and sufficiently tight joint therefor, which may be readily put in and removed by the use of the fingers alone and without additional tools.

Another object is to provide a coupling of this sort in which extremely accurate fitting and matching of contacting parts is unnecessary.

Another object is to provide a coupling which may be readily assembled without the use of special tools or readily repaired in the field without the use of special tools.

Another object is to provide a coupling of the type indicated in which not merely the mechanical pressure furnished by the coupling itself but the fluid pressure of the system to which the coupling is joined assists in making a leak-tight coupling or joint.

A still further object is to provide means for utilizing the coupling as a plug or analogous member where desired.

Other objects will appear from time to time in the specification and claim.

The invention is illustrated more or less diagrammatically in the accompanying drawing, wherein:

Figure 1 is a side elevation with parts broken away, showing one form of invention in use;

Figure 2 is a longitudinal sectional detail taken on an enlarged scale at line 2—2 of Figure 1;

Figure 3 is a view similar to Figure 2 showing a modified form;

Figure 4 is a longitudinal section showing a further modification;

Figure 5 illustrates the coupling as applied to a plug.

Like parts are designated by like characters throughout the specification and drawing.

1 is a tubular member associated with the coupling for attachment to any desired point of use. At one end the tubular member may be outwardly flared as at 2. This flare may take the form of an integral flaring of the tube itself and if so may be rounded or squared or otherwise shaped or it may take the form of an added disc, ring or plate, such as shown in Figure 4 and described below in detail.

Positioned on the tube in the form shown in Figure 2 is a disc 3 formed of rubber or other readily compressible material and associated with a second and preferably larger disc 4. The relative dimensions of these discs may be greatly varied. They may be of the same thickness or, as shown in Figure 2, of different thicknesses. Adjacent the disc 4 is a friction washer 5 which is preferably provided with sufficient clearance 6 about the tube 1 so that it may rotate or move readily with respect to the tube. A packing nut 7, threaded at 8 and provided with portions 9 by means of which it may be readily rotated is positioned about the tube and in the assembled joint holds the parts in place. At its inner end it is preferably cut away as at 10 to provide a reduced and relatively raised portion 11 which, when the joint is assembled, contacts the friction reducing washer 5.

In the particular form of the device shown in Figures 1 and 2, 12 is a fitting which is hollow and interiorly threaded as at 13 and may be secured to a pipe or any other desired point of attachment. Frequently it will be used as a connection to a tank in which or through which fluid under pressure passes. This member is threaded as at 14 to receive the threaded portion 8 of the nut 7. Interiorly from the threaded portion 14 it may have a smooth sided portion 15 terminating in a shoulder 16 and may have a rounded or tapered portion 17 which, in the form here shown, communicates finally with a reduced cylindrical section 18.

As shown in Figure 2 the joint is complete and it will be noticed that the flared end 2 of the tube does not contact the inner end 19 of the cylindrical portion 18 nor does it contact the sides of that portion. The clearances in the figure have been exaggerated to bring out the fact that the seal is not made at the inner end of the tube. The tube may, of course, contact the shoulder 19 or the walls 18 or both, but this is not necessary for the seal and whether or not it occurs is immaterial. The seal is made by the discs 3 and 4 which are in contact with some portion of the inner walls of the member 12 and which are under compression from the member 6. This member is screwed tightly in place and through the contact of the land 16 on the friction reducing washer 5, compression is exerted upon the discs 3 and 4. Where the coupling is associated in a pressure system fluid pressure is exerted against the disc 3 and through it compresses the total mass of discs, whether one or more is used. For some purposes one only will be used and for some purposes more than two will be used. As the members 3 and 4 come under compression, both mechanical, from the nut 7, and fluid from the fluid within the system, they are caused to engage not merely the interior walls of the member 12 but are also caused to engage the exterior of the tube 1 tightly, and the seal is made in these two zones by the compressible discs 3 and 4.

The form of the device shown in Figure 3 is generally the same as that in Figure 2. The tube is substantially the same although, as in the case of the device of Figure 1, instead of the flare 2 a ring or disc may be used secured to the inner end of the tube. The member 20 is generally analogous to the member 12 but is changed in its shape and proportions. It will normally be interiorly threaded as at 21 at one end and as at 22 at the opposite end. Inwardly from the threading 22 it has a generally unthreaded portion 23 terminating in a shoulder 24. It has a second unthreaded portion 25 terminating in a shoulder 26 and a passage 27 continuing through the member. In the particular form of Figure 3 a single compressible disc 28 is shown about the tube 1 and seated against the shoulder 24. More than one disc might be used. An antifriction washer 29 is positioned about the tube and against the disc 28. The parts are held in place and the coupling is completed by a nut 30 which fits about the tube and is screwed or rotated with respect to it. It is provided with a threaded portion 31 to mesh with threads 22 on the interior of the member 20 and may be squared or given any suitable shape 32 by means of which it may be readily turned to be put into place or removed. It might have members 9, as shown in Figure 1, or their equivalents. As shown in Figure 3 the inner end 2 of the tube 1 is not seated against the shoulder 26 nor does it contact the inner surface of the portion 25. It is to be understood as in the case of Figure 2, that contact at one or both of these places might occur, but the contact is not essential for a perfect seal and the seal occurs at the compressible disc or washer 28 which, when it is under mechanical compression or fluid compression, or both, makes a seal about the exterior of the tube and against some portion of the inner surface of the member 20.

A further modification is shown in Figure 4 in which a short tube 33 is provided at what will be its inner end with a ring 34 which is welded or soldered in place. Adjacent this end are two compressible discs or washers 35 and 36 and an antifriction washer 37 which may be provided with a clearance so that it can move freely with respect to the tube 33. A wing nut 38 is provided with the wings 39 by means of which it may be put into place and removed. It is exteriorly threaded as at 40 and may be cut away as at 41 to provide what is in effect a raised land 42. This device may be used generally in the association shown in Figures 1, 2 and 3 and threading 40 engages some suitable threading on the interior of a member to which the coupling is to be attached. At its outer end the tube 33 may have the shape indicated in Figure 4 as at 43, so that a rubber or other relatively flexible hose may be slipped over and held in place. A collar 44 may be added to limit the inward movement of the hose.

In the form of Figure 5 the coupling is used not on a hollow tube but it provides a seal for a plug, 45. As thus shown the parts in addition to the plug are the same as those shown in Figure 4. They are shown before insertion in a receiving member and, therefore, the sealing discs 35 and 36 and the friction washer 37 are separated from each other and the washer is not in contact with the portion 42 of the body 38. When the device of Fig. 5 is in use these parts will be compressed generally as shown in connection with the corresponding parts in Figs. 2 and 3 in particular. It is to be understood further that a plug, instead of a tube, might be substituted in the forms of the device shown in Figures 1, 2 and 3.

Since the members 34 and 44 of Fig. 5 perform exactly the same functions as corresponding members in Fig. 4, they have been given the same numbers.

The use and operation of the device as shown in the various forms of Figures 1 to 4, inclusive, are generally the same. The joint includes a tubular member having an enlarged end produced in any desired manner, and about the tube, preferably adjacent this enlarged end, are positioned one or more sealing members together with a friction reducing washer of metallic or other material harder than the sealing members, and lastly, a securing nut is positioned about the tube and adjacent the sealing parts and means are provided for rotating the nut. The parts thus far described are received in any desirable fitting, which may be arranged to receive it. The inner end of the tube does not of necessity contact any part of the fitting within which it is received. In some cases it may do so but it need not and whether it does or not, is immaterial to the effectiveness of the seal.

Whatever the shape of the member within which the sealing parts are received, those parts, in sealing position, contact the inner surfaces of the walls of the receiving member and are held in place and put under mechanical compression therein by the securing nut. When suitable compression has been thus applied, the sealing member is forced against the tube with sealing contact and against the inside surfaces of the receiving member. In ordinary use, the joint is used in connection with systems in which fluid pressure is present and this fluid pressure may be effective upon the sealing members to further compress them and thus to further increase the effectiveness of the sealing.

In the modified form of Figure 5 the same sealing effect is accomplished as that of the other forms but the joint acts as a plug and seal rather than as a seal for a tube which projects beyond the joint. The sealing effect is, however, obtained in the same manner.

I claim:

In combination in a pipe joint, a hollow receiving member shaped interiorly to provide a packing seat, a pipe inserted within said receiving member, a fastening nut positioned about said pipe and in threaded engagement with said receiving member, and a sealing member of relatively compressible material positioned about said pipe between said nut and said packing seat and in sealing contact with the pipe and with the seat, the end of said pipe which lies within said receiving member being flared to a size which prohibits the removal over it of the sealing member and the fastening nut.

RALPH E. EVARTS.